Nov. 27, 1928.  
L. A. WRIGHT  
1,692,881
MOTOR VEHICLE
Filed March 4, 1926
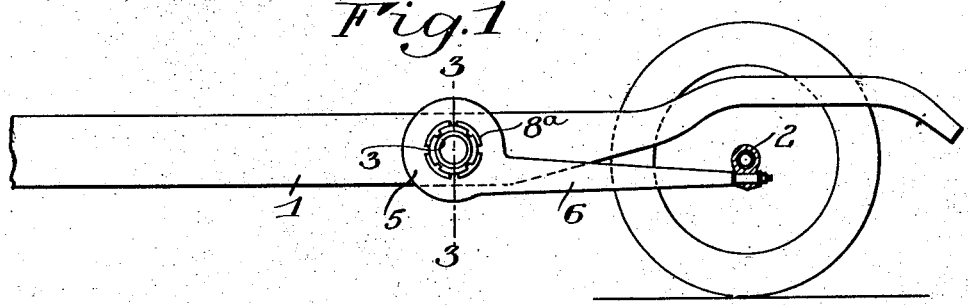
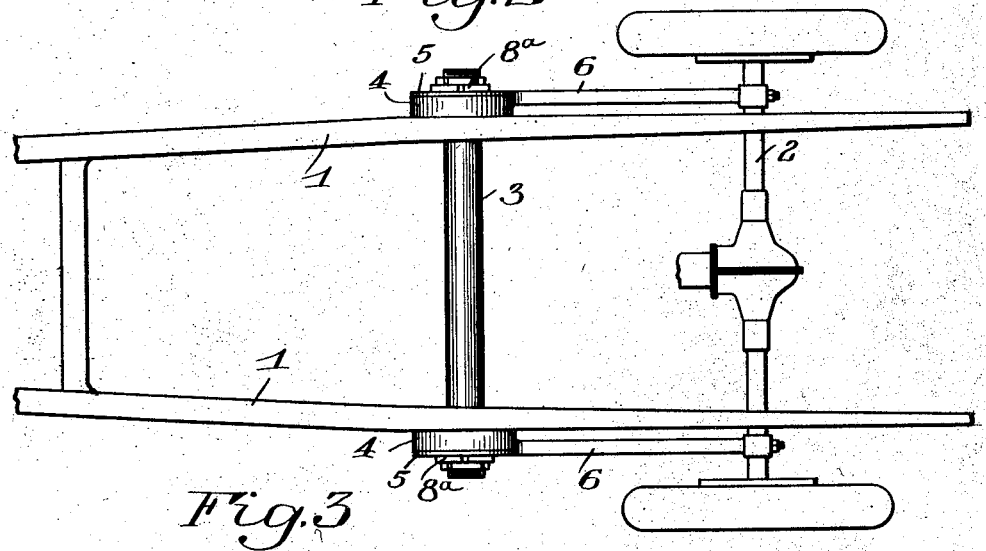
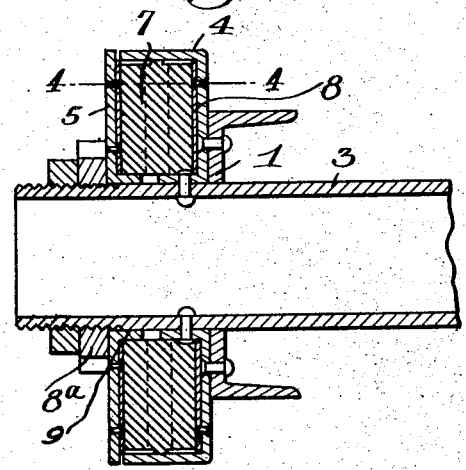
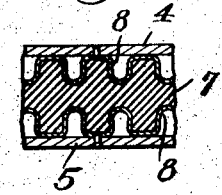
INVENTOR  
Lewis A. Wright  
BY Harold E. Stonebraker  
his ATTORNEY Patented Nov. 27, 1928.

1,692,881

UNITED STATES PATENT OFFICE.

LEWIS A. WRIGHT, OF BIRMINGHAM, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 4, 1926. Serial No. 92,255.

This invention relates to a motor vehicle, and has reference more particularly to the type of suspension illustrated in Patent No. 1,515,716, November 18, 1924, in which a connecting arm is connected at one end to an axle and at its opposite end to the frame through a rubber block having rib and groove connection with the connecting arm and frame and rigidly clamped therebetween.

The object of this invention is to afford a stronger and more rigid chassis construction through the use of a tubular cross member at a point of the frame where maximum stiffness is needed, such cross member serving as a support for the stationary section of the rubber block housing and also as a bearing for the movable section which is part of or rigidly connected to the forward end of the connecting arm.

A further purpose of the invention is to provide a construction such that the stationary section of the rubber block housing functions in the additional capacity of a tying means between the side and cross members of the frame, the cross member acting to support the front end of the connecting arm and to center it and the rubber block with reference to the stationary housing section.

To these and other ends, the invention comprises the construction and arrangement that will appear clearly from the following description when read in conjunction with the accompanying drawing, the novel features being pointed out in the claims following the description.

In the drawing:

Figure 1 is a side elevation of a portion of a motor vehicle frame showing a preferred embodiment of the invention applied thereto;

Figure 2 is a plan view;

Figure 3 is a vertical sectional view on line 3—3 of Figure 1, and

Figure 4 is a sectional view on line 4—4 of Figure 3.

Referring more particularly to the drawing, in which like reference characters refer to corresponding parts throughout the several views, 1 designates the side members of a motor vehicle frame, 2 is the rear axle, and 3 is a cross member, preferably tubular, and extending through openings in the side members 1 as shown in Figure 3. The cross member 3 is preferably located at the portion of the frame shown, forwardly of the axle, where extreme stiffness is needed, although it may be otherwise disposed if preferred.

Mounted on the tubular cross member 3 is a stationary housing section 4 which is riveted to the cross member 3 and also to the side member 1, as shown in Figure 3, thus affording an extremely stiff union between these parts. 5 designates a movable housing section formed upon or rigidly attached to the front end of the connecting arm 6 which is rigidly or otherwise connected to the axle 2.

The housing section 5 is journalled upon the tubular cross member 3 to permit of relative turning thereon, although the cross member may be otherwise constructed to afford a bearing for the movable housing section. 7 designates a rubber block formed on opposite sides with ribs and grooves engaging with correspondingly ribbed and grooved stamped metal plates 8 which are rigidly secured to the inner surfaces of the housing sections 4 and 5. The housing section 5, or front end of the connecting arm 6, is held in clamping relation with the rubber block 7 by means of a nut 8ª threaded on the tubular housing 3 and acting to grip the rubber block 7 tightly between the stationary housing section 4 and the relatively movable housing section 5.

By adjusting the nut 8ª, the extent of compression of the rubber block can be regulated, and likewise the resistance of the rubber to relative movement of the parts. The section 5 carries a flange 9 that closely embraces the tubular cross member 3, to effect a snug fit between these parts and prevent looseness or noise due to turning of the section 5. When relative movement occurs between the axle and frame, a slight turning of the housing section 5 takes place on the cross member 3, the parts being restored to normal relationship by the resistance and stiffness of the ribs in rubber block 7. It will be seen that the rubber block together with the corrugated members forms a resilient torque-resisting construction for opposing the tendency of the arm 6 to rotate about the cross piece 3. The rubber block assembly just described as mounted outside the side members of the frame may also be arranged between the side members, if desired.

While the invention has been described with reference to a particular construction, it is not confined to the precise details herein shown, and this application is intended to cover such modifications or departures as may come within the purposes of the improvement or the scope of the following claims.

I claim:

1. In a motor vehicle, the combination with an axle and frame having side members, of a cross member extending beyond the sides of said side members, a housing comprising a stationary section fixedly mounted on and a movable section journalled on said cross member, a rubber block clamped between and having rib and groove connection with said housing sections, and an arm rigidly united to said movable section and having its outer end connected to the axle.

2. In a motor vehicle, the combination with an axle and frame having side members, of a tubular cross member extending beyond the sides of said side members, a housing comprising a movable section journalled on said tubular cross member, a stationary housing section, a rubber block clamped between and having rib and groove connection with said housing sections, and an arm rigidly united to said movable section and having its outer end connected to the axle.

3. In a motor vehicle, the combination with an axle and frame having side members, of a tubular cross member extending beyond the sides of said side members and being restrained against rotation relative to said frame, a housing comprising relatively movable sections, a rubber block having rib and groove connection with and clamped between said sections, said cross member extending centrally through said sections and rubber block, one of the sections being fixed and the other turning on said cross member, and an arm rigidly united with said movable section and having its outer end connected to the axle.

4. In a motor vehicle, the combination with an axle and frame including a side member having an opening therethrough, of a tubular cross member extending through said opening, a housing comprising a stationary section mounted on said tubular cross member adjacent to the side member and rigidly secured to both said side member and cross member, a movable housing section journalled on the tubular member, a rubber block clamped between and having rib and groove connection with said housing sections, and an arm rigidly united to said movable section and having its outer end connected to the axle.

5. In a motor vehicle, the combination with an axle and frame including a side member having an opening therein, of a tubular cross member extending through said opening, a housing comprising relatively movable sections, a rubber block having rib and groove connection with and clamped between said sections, the cross member extending centrally through said sections and rubber block, one of the sections being rigidly secured to the side and cross members and the other turning on the cross member, means threaded on the cross member for engaging the movable housing section to clamp the rubber block, and an arm rigidly united with said movable section and having its outer end connected to the axle.

6. In a motor vehicle including a frame and an axle, a mechanism for supporting said frame from said axle comprising a transverse member extending entirely across said frame and connected thereto, a plurality of arms attached at one end to said axle, the other ends of said arms being loosely mounted upon said transverse member, and torque-resisting means operatively interposed between said transverse member and said arms.

In witness whereof, I have hereunto signed my name.

LEWIS A. WRIGHT.